US007672315B2

(12) United States Patent
Gupta et al.

(10) Patent No.: US 7,672,315 B2
(45) Date of Patent: Mar. 2, 2010

(54) METHODS AND APPARATUS FOR DESKEWING VCAT/LCAS MEMBERS

(75) Inventors: Dinesh Gupta, New Delhi (IN); Dev Shankar Mukherjee, New Delhi (IN); Rakesh Kumar Malik, New Delhi (IN)

(73) Assignee: Transwitch Corporation, Shelton, CT (US)

( * ) Notice: Subject to any disclaimer, the term of this patent is extended or adjusted under 35 U.S.C. 154(b) by 1219 days.

(21) Appl. No.: 11/210,127

(22) Filed: Aug. 23, 2005

(65) Prior Publication Data

US 2007/0047593 A1 Mar. 1, 2007

(51) Int. Cl.
*H04L 12/56* (2006.01)
(52) U.S. Cl. .................... 370/395.7; 370/468; 370/230; 370/395.51; 370/395.71
(58) Field of Classification Search ................. 370/235, 370/304, 539, 395.7, 395.71, 395.51, 468, 370/230
See application file for complete search history.

(56) References Cited

U.S. PATENT DOCUMENTS

| | | | | |
|---|---|---|---|---|
| 5,461,622 | A * | 10/1995 | Bleickardt et al. | 370/470 |
| 6,836,854 | B2 * | 12/2004 | Ranganath et al. | 713/503 |
| 7,054,331 | B1 * | 5/2006 | Susnow et al. | 370/465 |
| 7,349,445 | B2 * | 3/2008 | Hayashi | 370/516 |
| 7,411,900 | B2 * | 8/2008 | Acharya et al. | 370/217 |
| 7,415,048 | B2 * | 8/2008 | Wu | 370/542 |
| 7,424,036 | B1 * | 9/2008 | Alexander et al. | 370/474 |
| 7,489,710 | B2 * | 2/2009 | Gupta et al. | 370/516 |
| 2003/0043851 | A1 * | 3/2003 | Wu et al. | 370/476 |
| 2003/0112463 | A1 * | 6/2003 | Kimoto | 358/1.15 |
| 2004/0190561 | A1 * | 9/2004 | Imazeki | 370/516 |
| 2004/0213268 | A1 * | 10/2004 | Gupta et al. | 370/395.51 |
| 2004/0213299 | A1 * | 10/2004 | Gupta et al. | 370/539 |
| 2005/0135435 | A1 * | 6/2005 | Ishii | 370/539 |
| 2006/0067235 | A1 * | 3/2006 | Acharya et al. | 370/238 |
| 2006/0126641 | A1 * | 6/2006 | Song et al. | 370/395.51 |
| 2006/0187715 | A1 * | 8/2006 | Narvaez et al. | 365/185.24 |

OTHER PUBLICATIONS

Sherman et al.; "Benefits and Implementation of VC/LCAS in an Ethernet over SONET/SDH line Card";2004;Vitesse pp. 1-7.*
IEEE STD 802.3 (2005), Part 3, Carrier sense multiple access with collision detection (CSMA/CD) access method and physical layer specifications (Sections 1-5).
ITUT-T G707/Y.1322 Network node interface for the Synchronous Digital Hierarchy (SDH) International Telecommunication Union (Dec. 2003).
ITU-T G.7042/Y.1305 Link capacity adjustment scheme (LCAS) for virtual concatenated signals, International Telecommunication Union (Feb. 2004).

* cited by examiner

*Primary Examiner*—Ricky Ngo
*Assistant Examiner*—Dewanda Samuel
(74) *Attorney, Agent, or Firm*—Gordon & Jacobson, PC

(57) ABSTRACT

Write logic and read logic are coupled to SDRAM and a frame status table. VCG members are written into SDRAM by the write logic and an entry (based on the MFI and SQ) in the frame status table is maintained by the write logic for each member. The read logic scans the frame status table to identify the earliest frame number for which data is available in SDRAM. Based on the frame status and the address pointer offset, the read logic maintains a state table entry for each VCG member and a state for each VCG. According to the preferred embodiment, the read logic is provided in two parts separated by a temporary buffer. The first part of the read logic performs the functions described above and writes chunk data into the temporary buffer. The second part of the read logic reads byte data from the temporary buffer according to a selectable leak rate.

24 Claims, 5 Drawing Sheets

METHODS AND APPARATUS FOR DESKEWING VCAT/LCAS MEMBERS

BACKGROUND OF THE INVENTION

1. Field of the Invention

This invention relates broadly to telecommunications, the Synchronous Optical Network (SONET) and the Synchronous Digital Hierarchy (SDH). More particularly, this invention relates to buffer management during virtual concatenation (VCAT) and link capacity adjustment scheme (LCAS).

2. State of the Art

The Synchronous Optical Network (SONET) or the Synchronous Digital Hierarchy (SDH), as it is known in Europe, is a common telecommunications transport scheme which is designed to accommodate both DS-1 (T1) and E1 traffic as well as multiples (DS-3 and E-3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec. The frame includes the synchronous payload envelope (SPE) or virtual container (VC) as it is known in Europe, as well as transport overhead. Transport overhead is contained in the first three columns (27 bytes) and the SPE/VC occupies the remaining 87 columns.

In Europe, the base (STM-1) rate is 155.520 Mbit/sec, equivalent to the North American STS-3 rate (3*51.84=155.520). The STS-3 (STM-1) signals can accommodate 3 DS-3 signals or 63 E1 signals or 84 DS-1 signals, or a combination of them. The STS-12 (STM4) signals are 622.080 Mbps and can accommodate 12 DS-3 signals, etc. The STS-48 signals are 2,488.320 Mbps and can accommodate 48 DS-3 signals, etc. The highest defined STS signal, the STS-768, is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

To facilitate the transport of lower-rate digital signals, the SONET standard uses sub-STS payload mappings, referred to as Virtual Tributary (VT) structures. (The ITU calls these structures Tributary Units or TUs.) This mapping divides the SPE (VC) frame into seven equal-sized sub-frames or VT (TU) groups with twelve columns of nine rows (108 bytes) in each. Four virtual tributary sizes are defined as follows.

VT1.5 has a data transmission rate of 1.728 Mb/s and accommodates a DS1 signal with overhead. The VT1.5 tributary occupies three columns of nine rows, i.e. 27 bytes. Thus, each VT Group can accommodate four VT1.5 tributaries.

VT2 has a data transmission rate of 2.304 Mb/s and accommodates a CEPT-1 (E1) signal with overhead. The VT2 tributary occupies four columns of nine rows, i.e. 36 bytes. Thus, each VT Group can accommodate three VT2 tributaries.

VT3 has a data transmission rate of 3.456 Mb/s) and accommodates a DS1 C signal with overhead. The VT3 tributary occupies six columns of nine rows, i.e. 54 bytes. Thus, each VT Group can accommodate two VT3 tributaries.

VT6 has a data transmission rate of 6.912 Mb/s and accommodates a DS2 signal with overhead. The VT6 tributary occupies twelve columns of nine rows, i.e. 108 bytes. Thus, each VT Group can accommodate one VT6 tributary.

As those skilled in the art will appreciate, the original SONET/SDH scheme as well as the VT mapping schemes were designed to carry known and potentially foreseeable TDM (time division multiplexed) signals. In the early 1980s these TDM signals were essentially multiplexed telephone lines, each having the (now considered) relatively small bandwidth of 56-64 kbps. At that time, there was no real standard for data communication. There were many different schemes for local area networking and the wide area network which eventually became known as the Internet was based on a "56 kbps backbone". Since then, Ethernet has become the standard for local area networking. Today Ethernet is available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae).

In recent years it has been recognized that SONET/SDH is the most practical way to link high speed Ethernet networks over a wide area. Unfortunately, the various Ethernet transmission rates (10 Mbps, 100 Mbps, 1,000 Mbps, and 10,000 Mbps) do not map well into the SONET/SDH frame. For example, the original 10 Mbps Ethernet signal is too large for a VT-6 tributary (6.912 Mbps) but too small for an entire STS-1 (51.84 Mbps) path. In other words, under the existing SONET/SDH schemes, in order to transport a 10 Mbps Ethernet signal, an entire STS-1 path must be used, thereby wasting a significant amount of bandwidth. Similar results occur when attempting to map the faster Ethernet signals into STS signals.

In order to provide a scheme for efficiently mapping Ethernet signals (as well as other signals such as Fiber Channel and ESCON) into a SONET/SDH frame, the Virtual Concatenation (VCAT) Protocol was created and has been endorsed by the ITU as the G.707 standard (ITUT-T Rec. G.707/Y.1322 (December 2003)) which is hereby incorporated by reference herein in its entirety. Similar to inverse multiplexing, Virtual Concatenation combines multiple links (members) into one Virtual Concatenation Group (VCG), enabling the carrier to optimize the SDH/SONET links for Ethernet traffic. For example, using virtual concatenation, five VT-2 (2 Mbps) links can be combined to carry a 10 Mbps Ethernet signal, resulting in full utilization of allotted bandwidth. Two STS-1 (51 Mbps) links can be combined to carry a 100 Mbps Ethernet signal, etc. Virtual Concatenation uses SONET/SDH overhead bytes (four of the sixteen "H4" bytes) to indicate two numbers: the multiframe indicator (MFI) and the sequence number (SQ).

Part of the emerging Virtual Concatenation Protocol includes methods for dynamically scaling the available bandwidth in a SONET/SDH signal. These methods are known as the Link Capacity Adjustment Scheme or LCAS. LCAS is a powerful network management tool because customer bandwidth requirements change over time. One simple example is a network user who, during business hours, needs only enough bandwidth to support electronic mail and worldwide web access. During non-working hours, however, the same network user may wish to conduct relatively large data transfers from one location to another to backup daily transactions, for example. It would be desirable to alter the user's available bandwidth as needed. LCAS provides a means to do this without disturbing other traffic on the link. LCAS has been endorsed by the ITU as the G.7042 standard (ITU-T Rec. G.7042/Y.1305 (February 2004)) which is hereby incorporated by reference herein in its entirety.

While Virtual Concatenation is a simple labeling protocol, LCAS requires a two-way handshake (using seven of the sixteen H4 bytes for high order, STS-1, and seventeen of the thirty-two K4 bits for low order, VT1.5). Status messages are continually exchanged and actions are taken based on the content of the messages. For example, to provide high order (STS-1) virtual concatenation, each STS-1 signal carries one of six LCAS control commands which are described as follows:

"Fixed"—LCAS not supported on this STS-1 ("Fixed" is actually inferred rather than sent as a command. It is inferred when all of the LCAS fields other than MFI and SEQ are zero.);

"Add"—Expresses an intention to add this STS-1 to a VCG, thereby increasing the bandwidth of an existing VCG or creating a new VCG (Bandwidth is increased upon acknowledgement from the sink.);

"Norm"—This STS-1 is in use and is not the last member of a VCG;

"EOS"—This STS-1 is in use and is the last payload carrying STS-1 of this VCG, i.e. the payload carrying STS-1 with the highest SQ number;

"Idle"—This STS-1 is not in use in a VCG or is about to be removed from a VCG;

"Do not use"—This STS-1 is supposed to be part of a VCG, but does not transport payload due to a broken link reported by the destination. Members of a VCG which do not carry payload are termed "inactive" whereas members which carry payload are termed "active".

Although SONET is said to be synchronous, it is actually plesiochronous. The clocks at different switches in the network actually differ in rate and also drift somewhat. Measures are provided to account for these clock differences which are seen as "justifications" in the overhead of the SONET signal. These justifications instruct the next switch in the path to add or remove "stuff bytes".

Due to the nature of the SONET network, it is possible for individual members of a VCG to traverse different network paths between their origin and destination. Because of this, members will arrive at their destination out of order and with different delays. This situation is generally referred to as "skewing". In order to reassemble the members of a VCG in proper order without undue delay and without losing any members, the arriving members must be buffered and deskewed. Deskewing uses the multiframe indicator (MFI) as a time stamp to align all of the VCG members. Challenges to the deskewing process include: achieving minimal latency, accounting for justifications, adjusting for increases and decreases in member delay, dealing with the presence of inactive VCG members, and managing start-up and disruptions.

In its simplest form, deskewing involves placing members of a VCG in a buffer until the member with the most delay is received, then reading the members out of the buffer in the proper order. If the buffer is read at a fixed rate dictated by the slowest member, the other members still stay buffered incurring a latency dictated not by their differential delay but by the differential delay with respect to the slowest member. If a member with the largest delay is removed from a group, the other members of the group are still subject to the long delay and buffer space is wasted. As a result, in these systems the system delay is effectively the history of the member of the VCG having the longest delay. This is a likely situation in the case of bandwidth adjustments using the LCAS protocol or due to configuration changes.

SUMMARY OF THE INVENTION

It is therefore an object of the invention to provide a method for deskewing a SONET signal containing a VCG.

It is another object of the invention to provide a method for deskewing a SONET signal containing a VCG which achieves minimal latency.

It is a further object of the invention to provide a method for deskewing a SONET signal containing a VCG which accounts for justifications.

It is also an object of the invention to provide a method for deskewing a SONET signal containing a VCG which adjusts for changes in the path delay of VCG members.

It is an additional object of the invention to provide a method for deskewing a SONET signal containing a VCG which accounts for inactive VCG members.

It is still another object of the invention to provide a method for deskewing a SONET signal containing a VCG which manages start-ups and disruptions.

In accord with these objects, which will be discussed in detail below, write logic and read logic are coupled to SDRAM and a frame status table. Individual arriving VCG members are individually written into SDRAM by the write logic and an entry (based on the MFI and SQ) in the frame status table is maintained by the write logic for each member. The frame status is one of: started, finished, not started, and abandoned. The read logic scans the frame status table to identify the earliest frame number for which data of all members is available in SDRAM. Based on the frame status and the difference between the read and write address pointers, the read logic maintains a state table entry for each VCG member. Member state is one of: MFI wait offset wait due to slower member, MFI wait offset due to no read, MFI wait offset advance, and MFI advance. Based on the member states, the read logic computes a state for each VCG. The VCG states are initialized to the state of the first member and are updated as additional members of the VCG are encountered.

According to the preferred embodiment, the read logic is provided in two parts separated by a temporary buffer. The first part of the read logic performs the functions described above and writes chunk data into the temporary buffer. The second part of the read logic reads byte data from the temporary buffer according to a selectable leak rate (fast or slow) while maintaining approximately 15 microseconds of data in SDRAM and the temporary buffers. The second part of the read logic receives specific SONET signaling (clock, SPE, H3, and C1) and utilizes a bus limited to that signaling and the data (called the "combus") to transport bytes to a demapper. In the case of a fast leak, valid data is read out of the temporary buffer when the SPE is high and the leaked data is sent over the combus during the entire TOH part of the frame except for the C1 byte so that the demapper can identify the framing and hence the slots. In the slow leak mode, leaked data is read and sent in every H3 byte. The second part of the read logic provides feedback to the first part regarding the availability of space in the temporary buffer.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
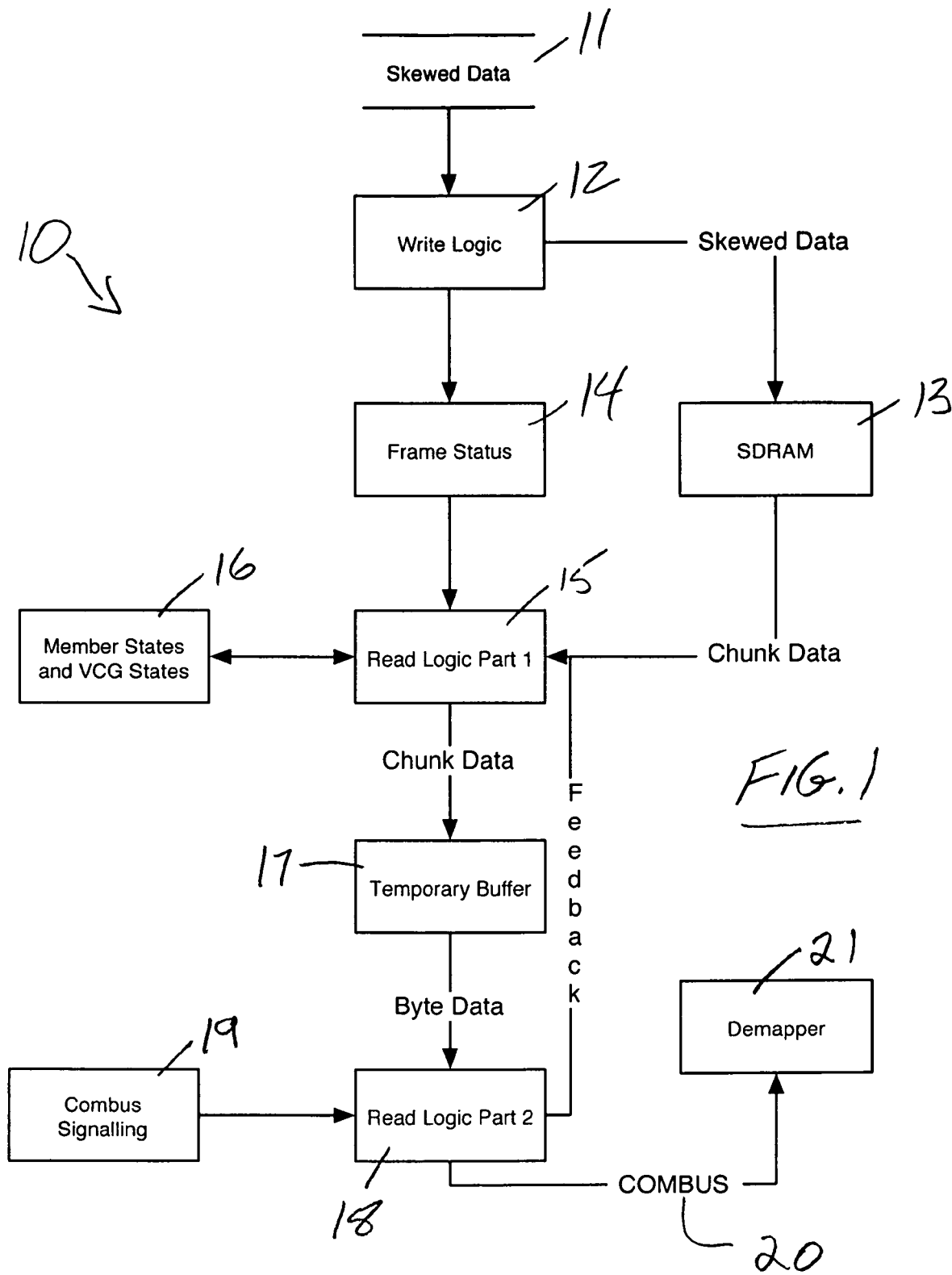
FIG. 1 is a simplified block diagram of an apparatus according to the invention.

Turning now to FIG. 1, a deskewing apparatus 10 according to the invention includes write logic 12, an SDRAM buffer 13, a frame status table 14, read logic 15, 18, a register 16 for storing member and VCG states and a temporary buffer 17. The write logic 12 receives skewed data 11 (VCG members with different delays and not necessarily in proper order). When the write logic 12 begins to receive a frame, it is written to the buffer 13 and, after a complete word is formed, the status of the frame is entered into the table 14. According to the presently preferred embodiment, the buffer 13 and the table 14 are sized to accommodate five hundred twelve frames of data and frame status indications respectively. The frame status values are listed and explained in Table 1.

TABLE 1

| Frame Status | Description |
| --- | --- |
| Not Started (FS_NS) | This is the default status indicating that no payload for this MFI number is available in the buffer. In addition, if the MFI of a member jumps forward, the write logic sets the status to Not Started for intervening MFI numbers. |
| Started (FS_S) | This indicates that some payload for this MFI number has been written to the buffer but the frame is not complete. |
| Finished (FS_F) | This indicates that this frame is completely written to the buffer. |
| Abandoned (FS_A) | This indicates that the frame could not be completed. |

The first part of the read logic 15 uses the frame status and the offset between the buffer write pointer and read pointer to determine when and what to read from the buffer 13 and store in the buffer 17. The first part of the read logic 15 outputs deskewed data (VCG members in proper order, one after the other, with no delay between members) to the temporary buffer 17.

The second part of the read logic 18 receives combus signaling 19 (including clock, SPE, H3, and C1) and utilizes the combus 20 to transport bytes to a demapper 21. In the case of a fast leak, valid data is read out of the temporary buffer 17 when the SPE signal is high and the leaked data is sent over the combus 20 during the entire TOH part of the frame except for the C1 byte so that the demapper can identify the framing and hence the slots. In the slow leak mode, leaked data is read and sent in every H3 byte. The second part of the read logic 18 also provides feedback to the first part 15 regarding the availability of space in the temporary buffer 17. The leak mode is normally set by the user and defaults to fast leak mode. However, the leak mode can be automatically adjusted by monitoring the pointer offset and causing a shift from slow leak mode to fast leak mode for a one time read if the pointer offset exceeds a threshold.

Figure 2:
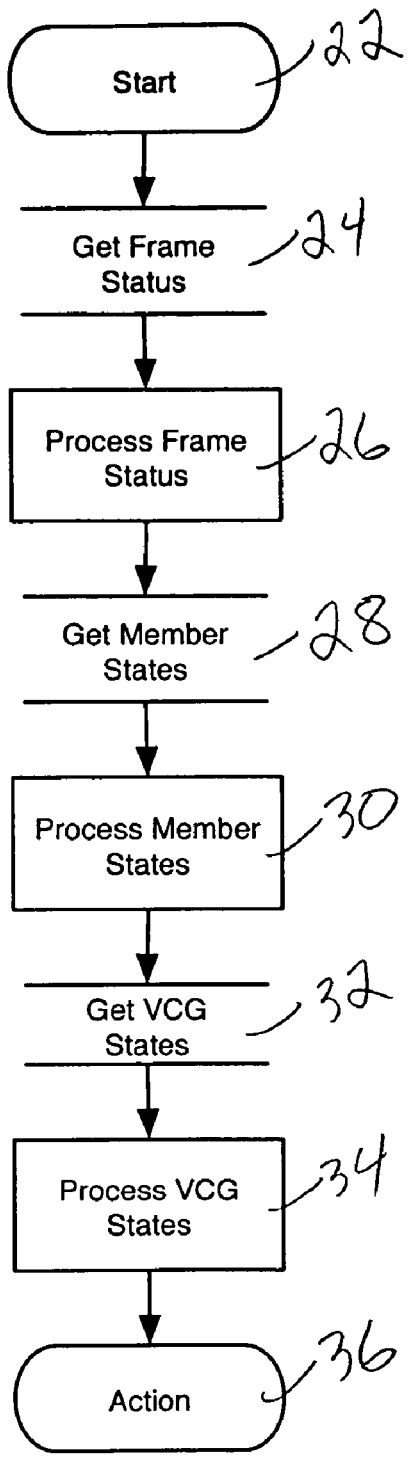
FIG. 2 is a simplified flowchart illustrating the methods of the invention.
Figure 3:
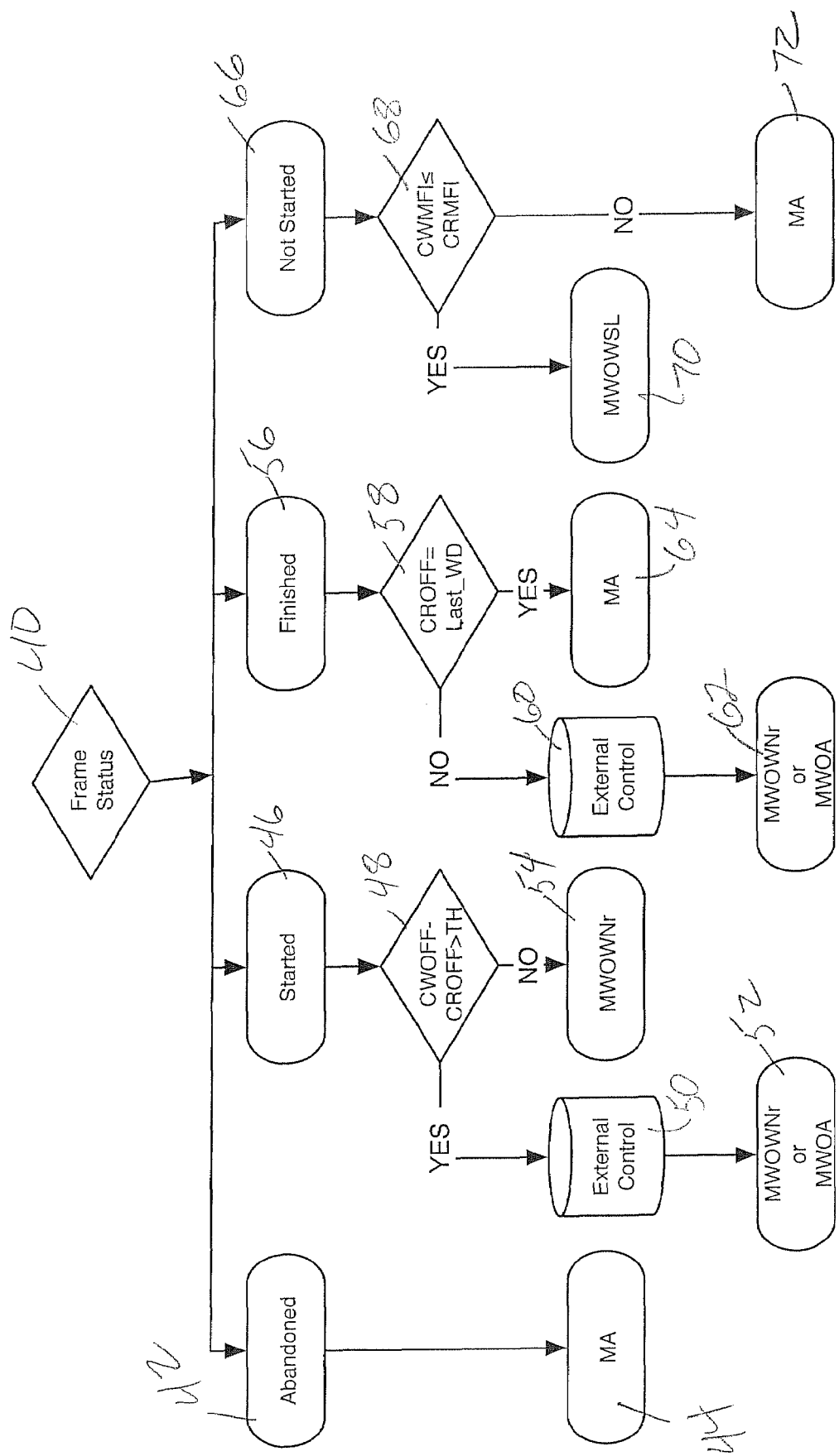
FIG. 3 is a simplified flowchart illustrating the processing of frame status and read and write pointer offsets to obtain member states.
Figure 4:
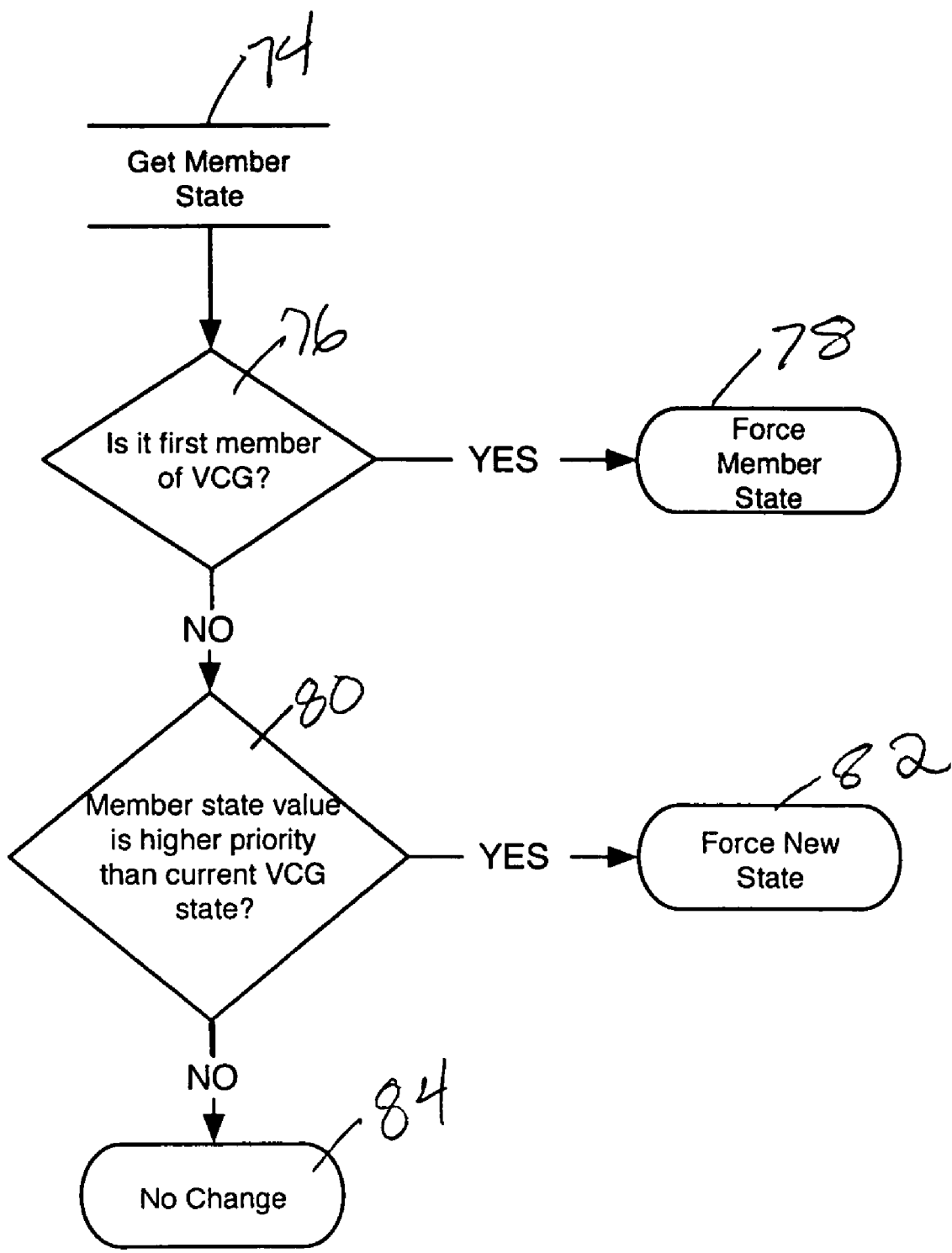
FIG. 4 is a simplified flowchart illustrating the processing of member states to obtain VCG state.

Those skilled in the art will appreciate that the MFI and SEQ numbers are distributed over sixteen frames. According to the presently preferred embodiment, the skewed data 11 is from an OC-48 signal and the concatenation is high order, i.e. up to 48 members. Therefore, 48×16 frames must be received before all of the MFI and SEQ numbers are known. (It will be appreciated, however, that the implementation also applies to a TU3.) The frame status table 14 is therefore preferably arranged with 48 columns and 512 rows. As the table 14 is filled, data is discarded until the MFI pattern is recognized. After the pattern is recognized, data is written to the SDRAM 13 using the MFI to address the data. Each MFI is associated with one frame which is 783 bytes (the payload of an STS-1, but it could also be implemented for the payload of a TU3). The frame status table 14 of this size can accommodate a maximum differential delay of 64 ms between members. This delay is the maximum differential delay experienced in a terrestrial network. FIG. 2 illustrates the basic sequence of processes performed by the read logic 16. FIGS. 3 and 4 illustrate the processing in more detail.

Turning now to FIG. 2. and with reference to FIG. 1, starting at 22, the read logic 15 reads the frame status table 14 at 24. For each entry in the frame status table, the read logic determines at 26 a member state which is stored in the register 16. The member state values are listed and explained in Table 2.

TABLE 2

| Member State | Description |
| --- | --- |
| MFI wait offset wait due to slower member (MWOWSL) | If there is no data available in the frame being addressed by the read logic and for any of the members of the VCG, the write address pointer is behind the read address, then wait for the write pointer to catch up. |
| MFI advance (MA) | Advance read MFI address of frame status table by one. This is done when the frame is read completely or frame status is not started and write MFI is ahead of read MFI or FS_A is encountered for any members of the VCG. |
| MFI wait offset wait due to no read (MWOWNr) | Do not change the read MFI address of the frame status table and read offset of SDRAM for current read frame. The no read may be because there is not enough data to begin reading. |
| MFI wait offset advance (MWOA) | Increment the read offset of the current read frame and read the frame from the buffer. |

After the entire frame status table for one MFI (for all the members of a VCG) has been processed at 26, the member states are read back at 28 and processed one by one at 30 to determine the VCG states which are also stored in the register 16. The VCG state values are determined from member state values. After all of the member states have been processed at 30, the VCG states are read back at 32 and processed at 34. The processing of VCG states consists of determining whether it is MWOA. At 36 the action taken is that described in Table 2 depending on the member state.

Turning now to FIG. 3, the read logic 15 reads the frame status table and generates a VCG member state for each entry in the table based on the table entry and the read and write pointer offsets. Starting at 40, the table entry is read and if it is abandoned (FS_A) as shown at 42, the member state is set to MA (MFI advance) as shown at 44.

If the frame status table entry is started (FS_S) as shown at 46, the difference between the current write pointer offset (CWOFF) and the current read pointer offset (CROFF) is calculated and a determination is made as to whether it exceeds a threshold (TH, e.g. 64 Bytes which equals 15 microseconds of a SONET stream) at 48. If the difference is greater than the threshold, an external control 50 chooses whether to set the member state at 52 to MWOWNr (wait due to no read) or MWOA (wait offset advance). The external control is a flow control signal from an on-chip internal FIFO through which packets pass. If that FIFO should overflow due to a data burst, the flow control signal can force the state to MWOWNr. If the FIFO is not overflowing, the state defaults to MWOA. If the difference between the pointer offsets is less than or equal to the threshold as determined at 48, the member state is set to MWOWNr (wait due to no read).

If the frame status table entry is finished (FS_F) as shown at 56, it is determined at 58 whether the current read pointer offset (CROFF) is equal to Last_WD as indicated by the read pointer offset. If it is not, external control 60 determines whether to set the member state at 62 to MWOWNr (wait due to no read) or MWOA (wait offset advance). The external control is a flow control signal from an on-chip internal FIFO through which packets pass. If that FIFO should overflow due to a data burst, the flow control signal can force the state to MWOWNr. If the FIFO is not overflowing, the state defaults to MWOA. If it is equal as determined at 58, the member state is set to MA (MFI advance) as shown at 64.

If the frame status table entry is not started (FS_NS) as shown at 66, it is determined at 68 whether the current write MFI is less than or equal to the current read MFI. If it is, the member state is set at 70 to MWOWSL (wait due to slow member). If it is not, the member state is set at 72 to MA (MFI advance).

FIG. 4 illustrates the functions performed by the read logic 15 in setting member states. Turning now to FIG. 4, starting at 74, member state is examined, then it is determined at 76 whether the member is the first member of a VCG. If it is, the member's state is considered to be the VCG state at 78. If the member is not the first member of a VCG, it is determined at 80 whether the member state is a higher priority than the current VCG state. If it is, the VCG state is advanced at 82. If it is not, no change is made to the VCG state at 84. This process is repeated for all of the members of the VCG. The VCG states are reported to the control plane.

Figure 5:
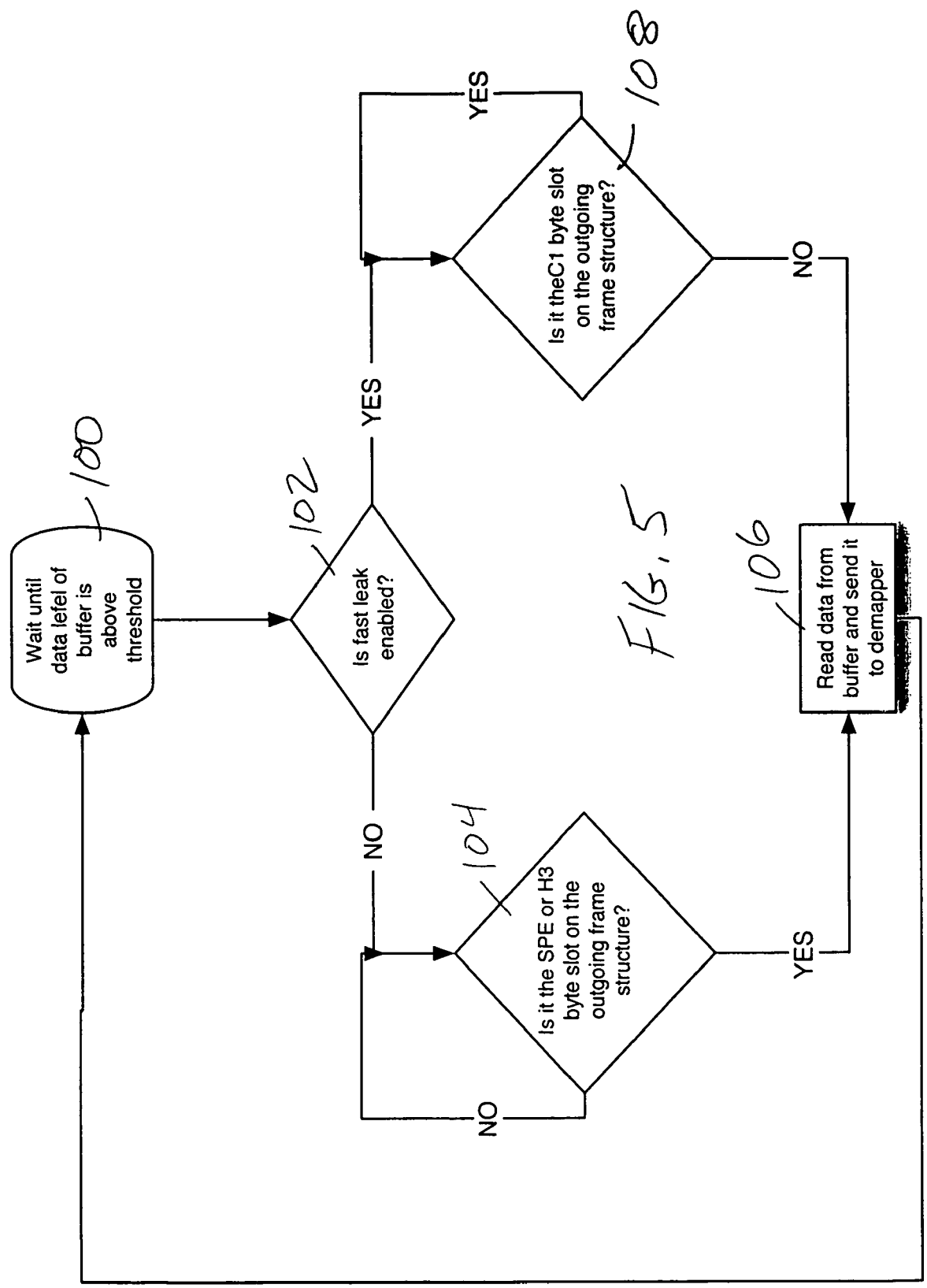
FIG. 5 is a simplified flow chart illustrating the operation of the second part of the read logic.

FIG. 5 illustrates how the second part of the read logic (18 in FIG. 1) reads the temporary buffer (17 in FIG. 1) based on combus signaling (19 in FIG. 1). Turning now to FIG. 5, the read logic waits at 100 until the temporary buffer is filled with 15 microseconds of data (based on the incoming data rate, e.g. 2,488.320 Mbps.) Once the temporary buffer has filled to that threshold, it is determined at 102 whether the data is to be read at a fast leak rate or a slow leak rate. If it is a slow leak rate, the read logic waits at 104 until the SPE signal is high or the H3 byte slot appears in the combus signaling (i.e., H3 high). Whenever the SPE signal or H3 is high, the read logic reads the data from the temporary buffer at 106 and sends it to the combus (20 in FIG. 1). In the case of a fast leak rate, the read logic reads the data from the temporary buffer at 106 and sends it to the combus (20 in FIG. 1) during all timeslots except when the C1 byte slot appears in the combus signaling at 108.

There have been described and illustrated herein methods and apparatus for deskew buffer management with VCAT and LCAS. While particular embodiments of the invention have been described, it is not intended that the invention be limited thereto, as it is intended that the invention be as broad in scope as the art will allow and that the specification be read likewise. For example, while the invention has been described with reference to external SDRAM, other types of internal or external memory could be used. Also, while the invention has been explained with reference to high order concatenation, it could be applied to low order. Also, while the fast leak has been described with reference to sending data during all timeslots except the C1 timeslot, it will be appreciated that a fast leak can be accomplished by sending data whenever the SPE is high and in a plurality of overhead slots of the combus (instead of just H3), provided that data is not sent during the C1 timeslot. It will therefore be appreciated by those skilled in the art that modifications could be made to the provided invention without deviating from its spirit and scope as claimed.

What is claimed is:

1. An apparatus for deskewing members of a virtual concatenated group (VCG) in a synchronous optical network/synchronous digital hierarchy (SONET/SDH) signal, comprising:

write logic coupled to a SONET/SDH signal source and to first and second memory means, the write logic storing in the first memory means data from a SONET/SDH signal generated by the SONET/SDH signal source, and the write logic storing in the second memory means frame status of members of a virtual concatenated group (VCG) in the SONET/SDH signal generated by the SONET/SDH signal source;

first read logic coupled to said first and second memory means, wherein said first read logic reads data from said first memory means based on frame status read from said second memory means and outputs deskewed data;

third memory means coupled to said first read logic for temporarily storing the deskewed data output by the first read logic; and second read logic coupled to said third memory means, wherein said second read logic reads data from said third memory means in accordance with a select one of a number of selectable operational modes that read data from said third memory means at different rates, said different rates dictated by data of said SONET/SDH signal generated by the SONET/SDH signal source.

2. The apparatus according to claim 1, wherein:

said second read logic does not read from said third memory means until a threshold amount of data is stored in said third memory means.

3. The apparatus according to claim 1, wherein:

said second read logic means receives a control signal which includes indication of SPE, H3 and C1 bytes.

4. The apparatus according to claim 3, wherein:

in a first operational mode, said second read logic reads data from said third memory means only in the presence of the SPE or H3 byte as part of the control signal, and in a second operational mode, said second read logic reads data from said third memory means only in the absence of the C1 byte as part of the control signal.

5. The apparatus according to claim 1, further comprising:

a demapper coupled to the second read logic via a control signal and data bus; wherein, when the second read logic reads data from said third memory means, it sends the data to the demapper via the control signal and data bus.

6. The apparatus according to claim 5, wherein:
said control signal and data bus includes a TOH portion and said second read logic sends data to said demapper during the TOH portion.

7. The apparatus according to claim 1, further comprising:
state memory means coupled to said first read logic for storing the states of VCG members and VCGs; wherein said first read logic computes member states according to frame status and pointer offset between said first read logic and said write logic, and said first read logic computes VCG state based on member states.

8. The apparatus according to claim 7, wherein:
said member states are selected from the group consisting of i) a first state relating to waiting for the pointer offset to cross a threshold, ii) a second state relating to advancing to the next address in the frame status table, iii) a third state relating to waiting for more data to begin reading, and iv) a fourth state related to reading a frame.

9. A method for deskewing members of a virtual concatenated group (VCG) in a synchronous optical network/synchronous digital hierarchy (SONET/SDH) signal, comprising:
receiving a SONET/SDH signal generated by a SONET/SDH signal source;
writing data from the received SONET/SDH signal to a first memory with an address based on multiframe index (MFI);
writing frame status of members of a virtual concatenated group (VCG) in the received SONET/SDH signal to a second memory with a pointer to the address where corresponding data is stored in the first memory;
reading deskewed data from the first memory based on frame status read from the second memory;
writing the deskewed data to a third memory; and
reading data from the third memory in accordance with a select one of a number of selectable operational modes that read data from the third memory at different rates, said different rates dictated by data of said SONET/SDH signal generated by the SONET/SDH signal source.

10. The method according to claim 9, wherein:
said third memory is not read until a threshold amount of data is stored in said third memory.

11. The method according to claim 9, wherein:
generating a control signal which includes SPE, H3 and C1 bytes.

12. The method according to claim 11, wherein:
in a first operational mode, said third memory is read only in the presence of the SPE or H3 byte as part of the control signal, and
in a second operational mode, said third memory is read only in the absence of the C1 byte as part of the control signal.

13. The method according to claim 9, further comprising:
transferring data read from said third memory to a demapper via a control signal and data bus.

14. The method according to claim 13, wherein:
said control signal and data bus includes a TOH portion and data is transferred to the demapper during the TOH portion.

15. The method according to claim 9, further comprising:
computing member states according to frame status and pointer offset between writing and reading the first memory;
storing the states of VCG members in a state memory;
computing VCG state based on member states; and
storing the VCG states in the state memory.

16. The method according to claim 15, wherein:
said member states are selected from the group consisting of i) a first state relating to waiting for the pointer offset to cross a threshold, ii) a second state relating to advancing to the next address in the frame status table, iii) a third state relating to waiting for more data to begin reading, and iv) a fourth state related to reading a frame.

17. An apparatus for deskewing members of a virtual concatenated group (VCG) in a synchronous optical network/synchronous digital hierarchy (SONET/SDH) signal used in conjunction with first memory means for storing data from the SONET/SDH signal and second memory means for storing frame status of members of a virtual concatenated group (VCG) in the SONET/SDH signal and pointing to an address where corresponding data is stored in the first memory means, comprising:
first read logic coupled to the first and second memory means, wherein said first read logic reads data from the first memory means based on the frame status read from the second memory means and outputs deskewed data;
third memory means coupled to said first read logic for temporarily storing the deskewed data output by the first read logic; and
second read logic coupled to said third memory means, wherein said second read logic reads data from said third memory means in accordance with a select one of a number of selectable operational modes that read data from said third memory means at different rates, said different rates dictated by data of said SONET/SDH signal.

18. An apparatus for bleeding out a buffer containing members of a virtual concatenated group (VCG) in a synchronous optical network/synchronous digital hierarchy (SONET/SDH) signal, comprising:
write logic coupled to a skewed SONET/SDH signal source;
first memory means coupled to the write logic for storing skewed data from the signal source;
first read logic coupled to said first memory means, said first read logic reading chunk data from said first memory means;
buffer means coupled to said first read logic for temporarily storing chunk data read by said first read logic; and
second read logic coupled to said buffer means, said second read logic reading byte data from said buffer means;
wherein said first read logic transfers data from said first memory means to said buffer means based on availability of data from the slowest VCG member in the first memory means and availability of empty locations in said buffer means.

19. The apparatus according to claim 18, wherein:
said second read logic is coupled to said first read logic,
said second read logic determines the availability of empty locations in said buffer means and communicates same to said first read logic.

20. The apparatus according to claim 18, further comprising:
a source of SPE, H3 and C1 signals coupled to said second read logic, wherein said second read logic reads data from said buffer means based on the appearance of SPE, H3 and C1 signals.

21. The apparatus according to claim 20, wherein:
ha slow leak mode, said second read logic only reads data in the presence of an SPE or H3 signal, and
in a fast leak mode, said second read logic only reads data in the absence of a C1 signal.

22. A method for bleeding out a buffer containing members of a virtual concatenated group (VCG) in a synchronous optical network/synchronous digital hierarchy (SONET/SDH) signal, comprising:
- writing skewed data from a skewed SONET/SDH signal source to a first memory;
- reading chunk data from said first memory;
- storing the chunk data in a buffer; and
- reading byte data from the buffer;
- wherein said reading and storing chunk data is based on availability of data from the slowest VCG member in the first memory and availability of empty locations in the buffer.

23. The method according to claim 22, wherein:
said reading byte data from the buffer is based on the appearance of SPE, H3 and C1 signals.

24. The apparatus according to claim 23, wherein:
in a slow leak mode, said reading byte data occurs only in the presence of an SPE or H3 signal, and
in a fast leak mode, said reading byte data occurs only in the absence of a C1 signal.

* * * * *